(No Model.)

J. DEWE.
METHOD AND MEANS OF EXHIBITING PHOTOGRAPHS.

No. 254,806. Patented Mar. 14, 1882.

Witnesses:
John Grist.
Fred. J. Ross.

Inventor:
John Dewe
By Henry Grist
Att'y.

UNITED STATES PATENT OFFICE.

JOHN DEWE, OF OTTAWA, ONTARIO, CANADA.

METHOD AND MEANS OF EXHIBITING PHOTOGRAPHS.

SPECIFICATION forming part of Letters Patent No. 254,806, dated March 14, 1882.

Application filed July 27, 1881. (No model.)

*To all whom it may concern:*

Be it known that I, JOHN DEWE, of the city of Ottawa, in the county of Carleton, in the Province of Ontario, Canada, have invented certain new and useful Improvements in the Art of Exhibiting Photographs and Frames therefor; and I do hereby declare that the following is a full, clear, and exact description of the same.

The object of this invention is to impart to photographs during exhibition light, shade, and color, whereby the perspective effect is beautified by the transmission of reflected rays through the picture from its rear, and also in the construction of a frame whereon the picture is placed in front and the reflecting colors or media behind, adjustable to different angles, to produce imitation of natural appearances in the picture; and my invention consists in first making the picture translucent by saturation with oils or other matter, and exhibiting it through a transparency adjusted to admit rays of light from the back of the picture, reflected from a colored or part colored or reflecting surface behind, so that by the arrangements of the colored and reflecting surface reflected hues are produced through the pictures, so as to produce the required effect; also, in coating or covering of the back of those parts of the picture where certain colors are required within certain defined limits with like colors of paint or paper, through which the light being reflected from a surface or colored media at the back of the picture will produce imitation of natural hues to those parts of the picture when viewed from its front; also, in an exhibiting-frame composed of two frames (the one in front to hold the picture, the other at the back to hold the reflecting matter) hinged together and having a prop to incline one part.

Figure 1:
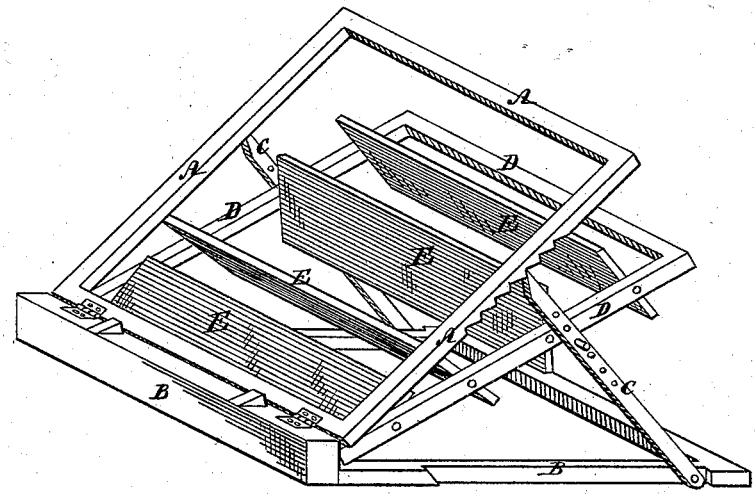
Figure 2:
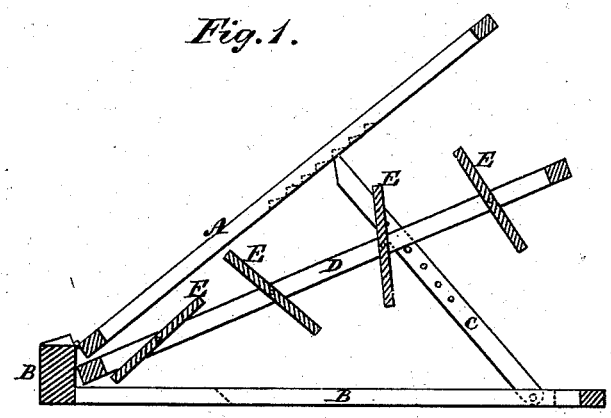
Figure 3:
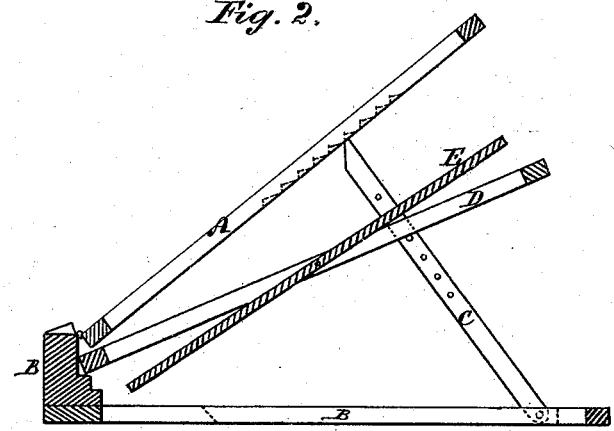

Figure 1 represents a perspective view of my exhibiting-frame. Fig. 2 is a vertical section of the same. Fig. 3 is a vertical section, showing a modified construction.

The photographic picture is made translucent by saturation with oil or other matter, and placed over or between a transparency to keep the picture smooth. The picture is then inclined toward the light, whereby the rays will pass through the picture from its back. A reflecting-surface of any suitable color or colors, or reflecting-media, is then placed at the back of the picture in such a position that rays from the reflecting-surfaces will be thrown against the back of the picture and produce a natural effect in the picture.

By a manipulation or arrangement of the reflecting-surfaces various lights and shadows can be produced, resembling those arising from causes natural to the sun, moon, clouds, &c.

To enhance the scenic effect of the picture, the parts to which a color is to be imparted within defined limits is covered at the back with a paint or paper of the colored desired, whereby the rays of light will pass through the color and impart its hue to the portions of the picture.

A frame adapted for carrying out my improved art of exhibiting pictures I will now proceed to describe, and which also will further explain my invention.

A is a frame, hinged at the lower end to a frame, B, which is provided with props C, engaging with notches in the frame A, whereby it may be adjusted to any suitable incline, and which is of ordinary construction.

D is a frame provided with axially-rotating slat or slats E, interposed between the frames A B and supported adjustably at an incline by pins passing through holes in the props C, or other suitable manner.

On the slat or slats E is placed the reflecting-surface, composed of gold, silver, or any color that may be required. The picture is placed against the frame A, adjusted at a suitable angle, with its back toward the light, which, striking on the colored surfaces on the slat or slats, is reflected on the back of the picture, and the hue is seen when viewing the picture from its front.

By manipulating the slats a variety of hues may be imparted to represent sunlight, moonlight, or other natural effect of light on the picture, and the adhesive coloring previously placed on the back of the picture will also be observable to enhance the scenic effect.

I claim as my invention—

1. The improved art of exhibiting photographs, by first making the picture translucent and exposing it on a suitable frame to the rays of light reflected from a colored and reflecting surface or surfaces at the back of the picture, whereby the reflected hue or hues are seen by an observer viewing the picture, and a natural effect of light, shade, and color produced.

2. The art of imparting a scenic effect to photographs exhibited by the aid of rays of light reflected against the back of the picture, consisting in applying coloring material to that portion of the back of the picture to which the desired hue of color is to be given, and then reflecting colored rays of light from a suitably-colored surface or surfaces at the back of the picture, substantially as described.

3. In combination with the frames A B and props C, the intermediate frame, D, provided with an axially-rotating slat or slats, E, as set forth.

JOHN DEWE.

Witnesses:
FRED. J. ROSS,
JOHN GRIST.